| United States Patent Office | 3,463,787 |
|---|---|
| | Patented Aug. 26, 1969 |

3,463,787
4-IMINO-3-PHENYL-2-OXOIMIDAZOLIDINE-1-ACETONITRILES
Frederick K. Kirchner, Bethlehem, and Andrew W. Zalay, Albany, N.Y., assignors to Sterling Drug Inc., New York, N.Y., a corporation of Delaware
No Drawing. Continuation-in-part of application Ser. No. 524,829, Feb. 3, 1966. This application May 31, 1968, Ser. No. 733,232
Int. Cl. C07d 49/30; A61k 27/00
U.S. Cl. 260—309.7                3 Claims

ABSTRACT OF THE DISCLOSURE 4-imino-3-phenyl-2-oxoimidazolidine - 1 - acetonitriles having utility as antiinflammatory agents are obtained by interacting iminodiacetonitrile with phenyl isocyanates.

---

This application is a continuation-in-part of prior copending application Ser. No. 524,829, filed Feb. 3, 1966, now U.S. Patent 3,429,911, issued Feb. 25, 1969.

This invention relates to compositions of matter classified in the art of chemistry as substituted imidazolidines.

The invention sought to be patented, in its composition aspect, is described as residing in the concept of a chemical compound having a molecular structure in which there is attached to a 4-imino-2-oxoimidazolidine nucleus a phenyl radical or its hereinafter disclosed equivalent in the 3-position and a cyanomethyl group in the 1-position.

The tangible embodiments of the composition aspect of the invention possess the inherent general physical properties of being white crystalline solids; are substantially insoluble in water; and are soluble in polar solvents, such as lower aliphatic alcohols. Examination of compounds produced according to the hereinafter described process reveals, upon infrared spectrographic and nuclear magnetic resonance spectroscopic analysis, spectral data confirming the molecular structure hereinbefore set forth. The aforementioned physical characteristics, taken together with the nature of the starting materials and the mode of synthesis, positively confirm the structure of the compositions sought to be patented.

The tangible embodiments of the invention possess the inherent applied use characteristics of exerting an antiinflammatory effect in animals, as evidenced by laboratory evaluation.

The manner and process of making and using the invention will now be generally described so as to enable a person skilled in the art of chemistry to make and use the same.

Iminodiacetonitrile is a known compound and is useful for conducting the reaction with an isocyanate RNCO, R representing the hereinbefore described phenyl radical. By such reaction there is produced the 4-imino-3-R-2-oxoimidazolidine-1-acetonitriles of the invention.

The physical embodiments of our concept are made by reacting iminodiacetonitrile with phenyl isocyanate bearing the phenyl moiety it is desired to have appear in the 3-position of the composition of the invention. Although the reaction may be carried out from ambient temperature to about 100° C. it is generally preferred to carry out the reaction above room temperature at about 60–70° C. When the reaction is carried out in the presence of an inert organic solvent, the temperature is generally maintained at about the reflux temperature. The reaction is generally completed in one hour. The proportion of the reactants is preferably equimolar.

The reaction proceeds via the appropriate intermediate ureas RNHCON(CH$_2$CN)$_2$ which cyclize to the products of the invention. Although in certain instances the ureas can be isolated they cyclize upon standing or by suspension in an inert solvent. The inventors contemplate the intermediate ureas as within the scope of their invention.

The best mode contemplated by the inventors of carrying out their invention will now be set forth as follows:

Example 1

To a solution of 9.5 g. of iminodiacetonitrile in 45 ml. of tetrahydrofuran was added 18.8 g. of 3,5-dichlorophenyl isocyanate and the mixture refluxed for one-half hour. Addition of benzene caused the separation of a solid which was collected by filtration to give 20.8 g. of 1-bis(cyanomethyl)-3-(3,5-dichlorophenyl)urea of the formula

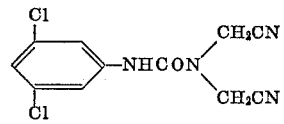

and which melted at 103–105° C.

Recrystallization from a tetrahydrofuran-benzene mixture, either by sequential heating and cooling, or at ambient temperature or at 0° C. gave the cyclized product 3-(3,5-dichlorophenyl)-4-imino-2 - oxoimidazolidine - 1-acetonitrile of the formula

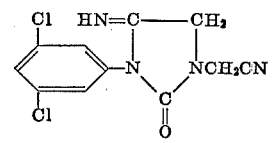

and which melted at 147–149° C.

Example 2

A solution of 43 g. of 4-nitrophenyl isocyanate in 150 ml. of benzene was added to 23 g. of iminodiacetonitrile in 300 ml. of toluene. The solid which precipitated was collected by filtration and dried overnight at 60° C. then recrystallized from a mixture of 80 ml. of dimethylformamide and 100 ml. of ether. The light yellow crystals were collected by filtration to give 15 g. of 4-imino-3-(4-nitrophenyl)-2-oxoimidazolidine - 1 - acetonitrile of the formula

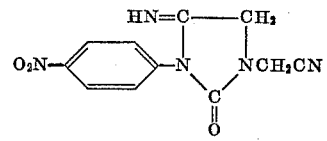

and which melted at 186–187° C.

The intermediate 1-bis(cyanomethyl)-3-(4-nitrophenyl)-urea of the formula

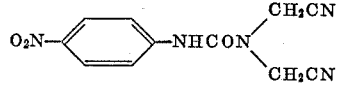

was not isolated but rather was cyclized during recrystallization.

Example 3

(a) A solution of 38 g. of iminodiacetonitrile in 100 ml. of tetrahydrofuran was treated with 30.8 g. of 4-chlorophenyl isocyanate in 50 ml. of tetrahydrofuran and the mixture heated on a steam bath for one-half hour. Benzene (200 ml.) was added and the mixture slightly concentrated. The solid which separated on cooling was collected by filtration and dried to give 1-bis-(cyanomethyl)-3-(4-chlorophenyl)urea of the formula

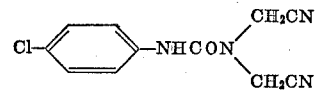

and which melted at 95–96° C.

The urea was converted to the cyclized product either by suspension in toluene followed by refluxing or by standing at ambient temperature for several weeks. The 3 - (4 - chlorophenyl) - 4 - imino-2-oxoimidazolidine-1-acetonitrile thus obtained melted at 152–157° C. and had the formula

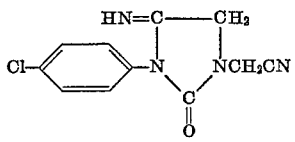

(b) A solution of 5 g. of the above 3-(4-chlorophenyl)-4-imino-2-oxoimidazolidine-1-acetonitrile in 40 ml. of tetrahydrofuran in a pressure flask was cooled to 25° C. and 1.3 ml. of methyl isocyanate added. After standing for forty-eight hours at room temperature the mixture was concentrated under diminished pressure. The crystalline residue was recrystallized from a benzene-cyclohexane mixture to give 5.2 g. of 3-(4-chlorophenyl)-4 - (methylcarbamoylimino)-2-oxoimidazolidine-1-acetonitrile having the formula

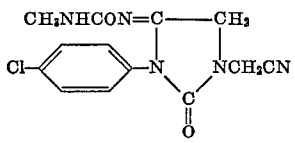

and which melted at 151–153° C.

(c) Following the same procedure but using 2.5 ml. of 4-chlorophenyl isocyanate rather than methyl isocyanate there was obtained 7.3 g. of 3-(4-chlorophenyl)-4 - (4-chlorophenylcarbamoylimino)-2-oxoimidazolidine-1-acetonitrile having the formula

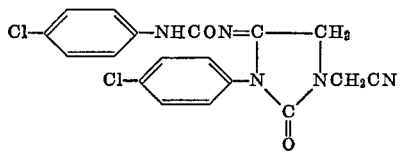

and which melted at 212–214° C.

(d) The imino group of 3-(4-chlorophenyl)-4-imino-2-oxoimidazolidine-1-acetonitrile was hydrolyzed in 1 N hydrochloric acid at room temperature to give 3-(4-chlorophenyl) - 2,4-dioxoimidazolidine-1-acetonitrile having the formula

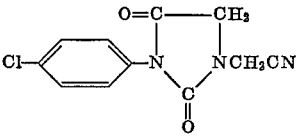

and which melted at 164–165° C.

Example 4

Proceeding in a manner similar to that described above in Example 3(a), except the isolation of the intermediate, i.e., 1-bis(cyanomethyl)-3-phenylurea was omitted, and using 19 g. of iminodiacetonitrile and 22 g. of phenyl isocyanate there was obtained 7.7 g. of 4-imino-3-phenyl-2-oxoimidazolidine-1-acetonitrile of the formula

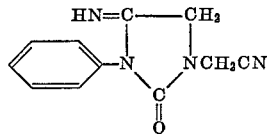

and which melted at 100–104° C.

Example 5

Proceeding in a manner similar to that described above in Example 3(a), except the isolation of the intermediate, i.e., 1-bis(cyanomethyl)-3-(4-methoxyphenyl)-urea was omitted, and using 19 g. of iminodiacetonitrile and 30 g. of 4-methoxyphenyl isocyanate there was obtained 33.7 g. of 3-(4-methoxyphenyl)-4-imino-2-oxoimidazolidine-1-acetonitrile, of the formula

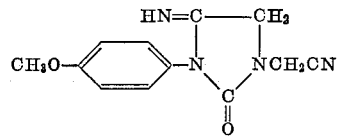

and which melted at 131–133° C.

Example 6

Proceeding in a manner similar to that described above in Example 3(a), except the isolation of the intermediate, i.e., 1 - bis(cyanomethyl)-3-(3-chlorophenyl)urea was omitted, and using 19 g. of iminodiacetonitrile and 30.8 g. of 3-chlorophenyl isocyanate there was obtained 18.9 g. of 3 - (3 - chlorophenyl) - 4-imino-2-oxoimidazolidine-1-acetonitrile, of the formula

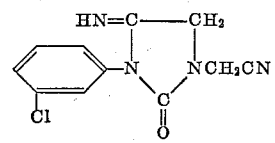

and which melted at 122–123° C.

Example 7

Proceeding in a manner similar to that described above in Example 3(a), except the isolation of the intermediate, i.e., 1 - bis(cyanomethyl) - 3 - (2-chlorophenyl)urea was omitted, and using 19 g. of iminodiacetonitrile and 30.8 g. of 2-chlorophenyl isocyanate there was obtained 16 g. of the desired 3-(2-chlorophenyl)-4-imino-2-oxoimidazolidine-1-acetonitrile having the formula

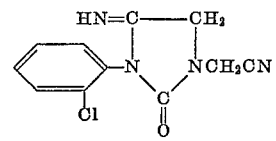

and which melted at 157–158° C.

Example 8

Proceeding in a manner similar to that described above in Example 3(a), except the isolation of the intermediate, i.e., 1 - bis(cyanomethyl)-3-(3,4-dichlorophenyl)-urea was omitted, and using 9.5 g. of iminodiacetonitrile and 18.8 g. of 3,4-dichlorophenyl isocyanate there was obtained 19 g. of the desired 3-(3,4-dichlorophenyl)-4 - imino - 2 - oxoimidazolidine - 1 - acetonitrile having the formula

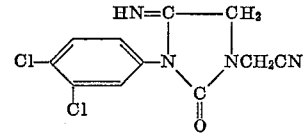

and which melted at 138–141° C.

Example 9

Proceeding in a manner similar to that described above in Example 3(a), except the isolation of the intermediate, i.e., 1 - bis(cyanomethyl) - 3-(4-bromophenyl)urea was omitted, and using 9.5 g. of iminodiacetonitrile and 20 g. of 4-bromophenyl isocyanate there was obtained 15 g. of the desired 3 - (4 - bromophenyl)4-imino-2-oxoimidazolidine having the formula

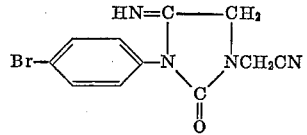

and which melted at 163–165° C.

Example 10

Proceeding in a manner similar to that described above in Example 3(a), except the isolation of the intermediate, i.e. 1-bis(cyanomethyl)-3-(2,4-dichlorophenyl)urea was omitted, and using 9.5 g. of iminodiacetonitrile and 18.8 g. of 2,4-dichlorophenyl isocyanate there was obtained 13.4 g. of the desired 3-(2,4-dichlorophenyl)-4-imino-2-oxoimidazolidine-1-acetonitrile having the formula

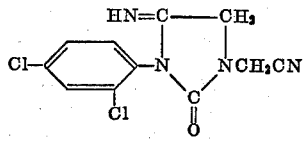

and which melted at 112–115° C.

Example 11

Proceeding in a manner similar to that described above in Example 3(a) and using 6.6 g. of iminodiacetonitrile and 9.6 g. of 4-fluorophenyl isocyanate there was obtained 8.3 g. of 1-bis(cyanomethyl)-3-(4-fluorophenyl)urea having the formula

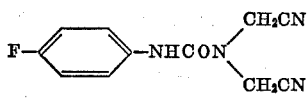

and which melted at 85–87° C.

The urea was dissolved in hot toluene and the mixture cooled; the precipitate formed was collected and dried to give 5 g. of 3-(4-fluorophenyl)-4-imino-2-oxoimidazolidine-1-acetonitrile having the formula

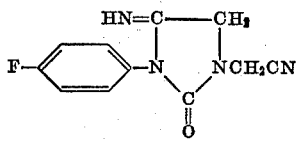

and which melted at 151–152° C.

Example 12

Proceeding in a manner similar to that described above in Example 3(a), except the isolation of the intermediate, i.e. 1-bis(cyanomethyl)-3-(4-tolyl)urea was omitted and using 9.5 g. of iminodiacetonitrile and 13.3 g. of 4-tolyl isocyanate there was obtained 21 g. of 4-imino-2-oxo-3-(4-tolyl)imidazolidine-1-acetonitrile having the formula

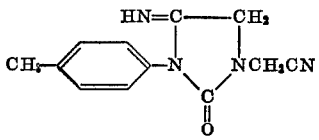

and which melted at 166–167° C.

Example 13

Proceeding in a manner similar to that described above in Example 3(a), except the isolation of the intermediate, i.e. 1-bis(cyanomethyl)-3-(3-trifluoromethylphenyl)urea was omitted, and using 9.5 g. of iminodiacetonitrile and 17.5 g. of 3-trifluoromethylphenyl isocyanate there was obtained 28.8 g. of 4-imino-3-(3-trifluoromethylphenyl)-2-oxoimidazolidine-1-acetonitrile having the formula

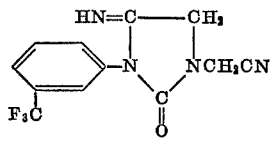

and which melted at 86–87° C.

Example 14

Proceeding in a manner similar to that descirbed above in Example 3(a), except the islation of the intermediate, i.e. 1-bis(cyanomethyl)-3-(4 - methylmercaptophenyl) urea was omitted, and using 9.5 g. of iminodiacetonitrile and 16.5 g. of 4-methylmercaptophenyl isocyanate there was obtained 12 g. of 4-imino-3-(4-methylmercaptophenyl)-2-oxoimidazolidine-1-acetonitrile having the formula

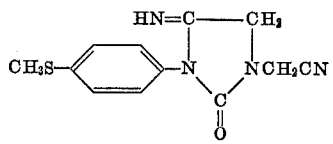

and which melted at 80–87° C.

The intermediate 4-methylmercaptophenyl isocyanate was prepared by a reaction of 87.8 g. of 4-methylmercaptoaniline and a saturated solution of phosgene in chlorobenzene to give 74 g. of 4-methylmercaptophenyl isocyanate, B.P. 117–118° C./8 mm.

Example 15

Proceeding in a manner similar to that described above in Example 3(a), except the isolation of the intermediate, i.e. 1-bis(cyanomethyl)-3 - (4 - acetyphenyl)urea was omitted, and using 9.5 g. of iminodiacetonitrile and 16.1 g. of 4-acetylphenyl isocyanate there was obtained 19.5 g. of 3-(4-acetylphenyl)-4-imino - 2 - oxoimidazolidine-1-acetonitrile having the formula

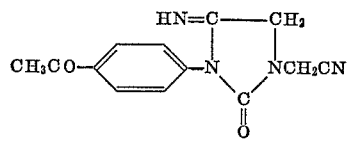

and which melted at 97–98° C.

Example 16

Proceeding in a manner similar to that descirbed above in Example 3(a), except that the isolation of the intermediate, i.e. 1-bis(cyanomethyl)3-(4-cyanophenyl)urea was omitted, and using 9.5 g. of iminodiacetonitrile and 14.4 g. of 4-cyanophenyl isocyanate there was obtained 16 g. of 3-(4-cyanophenyl)-4-imino - 2 - oxoimidazolidine-1-acetonitrile having the formula

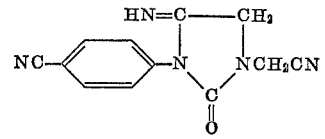

and which melted at 209–210° C.

Example 17

Proceeding in a manner similar to that described above in Example 3(a), except that the isolation of the intermediate, i.e. 1-bis(cyanomethyl)-3 - (4 - trifluoromethylphenyl)urea was omitted, and using 9.5 g. of iminodiacetonitrile and 17.5 g. of 4-trifluoromethylphenyl isocyanate there was obtained 15 g. of 4-imino-3-(4-trifluoromethylphenyl)-2-oxoimidazolidine-1-acetonitrile having the formula

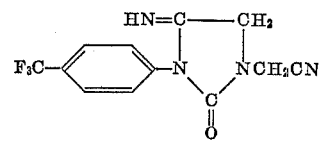

and which melted at 125–126° C.

The intermediate 4-trifluoromethylphenyl isocyanate was prepared by the reaction of 75 g. of 4-trifluoromethylaniline and a saturated solution of phosgene in toluene to give 56 g. of 4-trifluoromethylphenyl isocyanate, B.P. 63–64° C./14 mm.

It will be apparent to those skilled in the art any number and kind of substituents may be attached to the phenyl radical in the three position. Among such substituents are, without limiting the generality of the foregoing lower alkylphenyl, e.g. methylphenyl, ethylphenyl, isopropylphenyl, or any other analogous lower alkylphenyl radical, halophenyl, e.g. chlorophenyl, bromophenyl, iodophenyl or any other analogous halophenyl radical, lower alkoxy phenyl, e.g. methoxyphenyl, ethoxyphenyl, butoxyphenyl or any other analogous lower alkoxyphenyl radical, cyanophenyl, nitrophenyl, trifluoromethylphenyl, lower alkylmercaptophenyl, e.g. methylmercaptophenyl, butylmercaptophenyl or any other analogous lower alkylmercaptophenyl radical, lower alkylsulfinylphenyl, e.g. methylsulfinylphenyl, propylsulfinylphenyl or any other analogous lower alkylsulfinylphenyl radical, lower alkylsulfonylphenyl, e.g. methylsulfonylphenyl, ethylsulfonylphenyl, hexylsulfonylphenyl or any other lower alkylsulfonylphenyl radical, N-acylaminophenyl, such as N-lower alkanoylaminophenyl, e.g. N-acetylaminophenyl, N-butyrylaminophenyl as well as N-benzoylaminophenyl or any other analogous N-acylaminophenyl radical, N,N-di-lower alkylaminophenyl, e.g. N,N-dimethylaminophenyl, N-methyl-N-ethylaminophenyl or any other analogous N,N-di-lower alkylaminophenyl radical, or any equivalent substituted phenyl radical. Substituents on the phenyl group must be of a nature that they are not reactive with the isocyanate and among such groupings those skilled in the art will recognize are amino, hydroxy, carboxy and mercapto.

The substituents on the phenyl radical above enumerated do not materially affect adversely the utility hereinbefore asserted for the unsubstituted-phenyl compound.

The benzene ring can be replaced by equivalent polycyclic aromatic rings e.g. 1-naphthyl, 2-naphthyl or substituted 1-naphthyl or substituted 2-naphthyl wherein one or more of the same or different substituents may be attached to any of the available positions. Moreover the benzene ring can be replaced by equivalent heterocyclic aromatic rings, e.g. pyridyl, furyl, thienyl, isoquinolyl, quinolyl, thiazolyl, pyrimidyl or these groups containing additional substituents, e.g. lower alkyl, lower-alkoxy, halo or other substituents.

The compounds of this invention can be used in the form of compositions for oral or parenteral use which contain the compounds in admixture with an organic or inorganic solid or liquid carrier. The compositions can be in the form of tablets, lozenges, capsules, dragees, pills, powders and aqueous and non-aqueous solutions or suspensions. In preparing such compositions there can be used for example carriers such as water, gelatin, sugars, e.g. lactose and sucrose, starches, cellulose derivatives, talc, stearic acid, magnesium stearate, gums, vegetable oils, such as peanut oil, cottonseed oil, sesame oil, olive oil and corn oil, propylene glycol, polyalkylene glycols, alginic acid or any other known carrier used for such preparations. The compositions can contain auxiliary substances, such as preserving, stabilizing, emulsifying, coloring, flavoring and wetting agents, buffers, etc.

We claim:

1. 4-imino-3-R-2-oxoimidazolidine-1-acetonitrile wherein R is phenyl or phenyl substituted by lower alkyl, halo, lower alkoxy, cyano, nitro, trifluoromethyl, lower alkylmercapto, lower alkylsulfinyl, lower alkylsulfonyl, lower alkanoyl, lower alkanoylamino, benzoylamino and di-lower-alkylamino.

2. A compound according to claim 1 wherein R is halophenyl.

3. 4 - imino-3-(4-chlorophenyl)-2-oxoimidazolidine-1-acetonitrile according to claim 2 wherein R is 4-chlorophenyl.

References Cited

FOREIGN PATENTS 629,779  10/1963  Belgium.

HENRY R. JILES, Primary Examiner

N. TROUSOF, Assistant Examiner

U.S. Cl. X.R.

260—453, 465, 999

PO-1050
(5/69)

UNITED STATES PATENT OFFICE
CERTIFICATE OF CORRECTION

Patent No. 3,463,787      Dated August 26, 1969

Inventor(s) Frederick K. Kirchner and Andrew W. Zalay

It is certified that error appears in the above-identified patent and that said Letters Patent are hereby corrected as shown below:

Column 1, line 52, "Iminodiacetonitraile" should read --Iminodiacetonitrile--. Column 4, line 16, "iminodiacetontrl should read --iminodiacetonitrile--; lines 67-68, "3-(4-bromophenyl)4-imino-2-oxoimidazolidine" should read --3-(4-bromophenyl)-4-imino-2-oxoimidazolidine-1-acetonitrile--. Column 5, line 73, "descirbed" should read --described--; line 74, "islation" should read --isolation--. Column 6, line 13, "by a reaction" should read --by the reaction--; line 21, "...(4-acetyphenyl)urea" should read --...(4-acetylphenyl)urea--; line 36, "descirbed" should read --described--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents